May 7, 1963

O. D. GOOD ET AL 3,088,501

PANEL CONTROL SAWMILL

Filed Dec. 5, 1960

7 Sheets-Sheet 1

INVENTORS
Orland D. Good and
Dewey Walls

BY Hyatt Dowell

ATTORNEY

INVENTORS
Orland D. Good
Dewey Walls
BY
ATTORNEY

INVENTORS
Orland D. Good and
Dewey Walls
BY  *Hyatt Dowell*
ATTORNEY

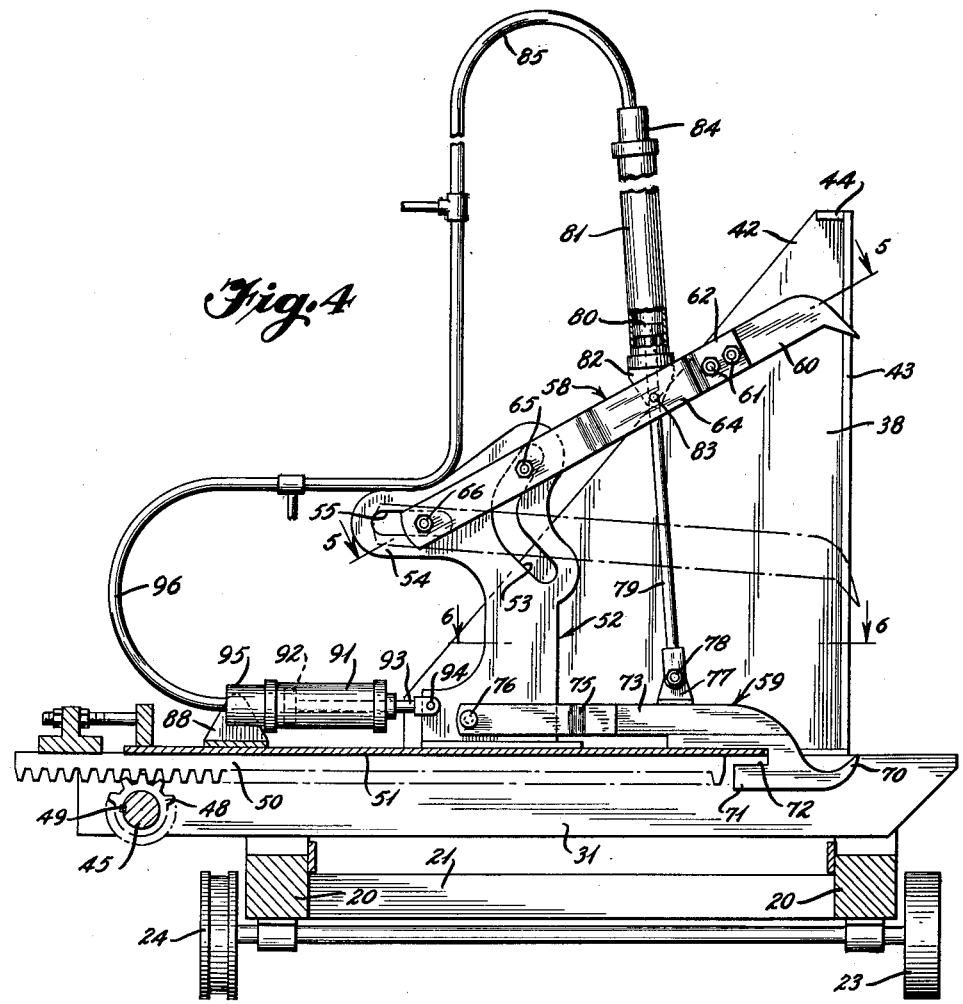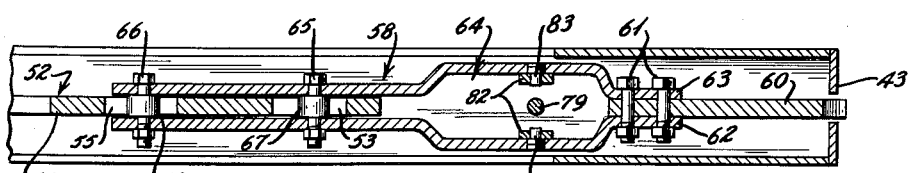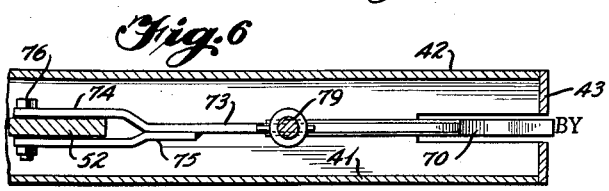

May 7, 1963

O. D. GOOD ET AL 3,088,501

PANEL CONTROL SAWMILL

Filed Dec. 5, 1960

7 Sheets-Sheet 5

INVENTORS
Orland D. Good
Dewey Walls

BY A. Yates Dowell

ATTORNEY

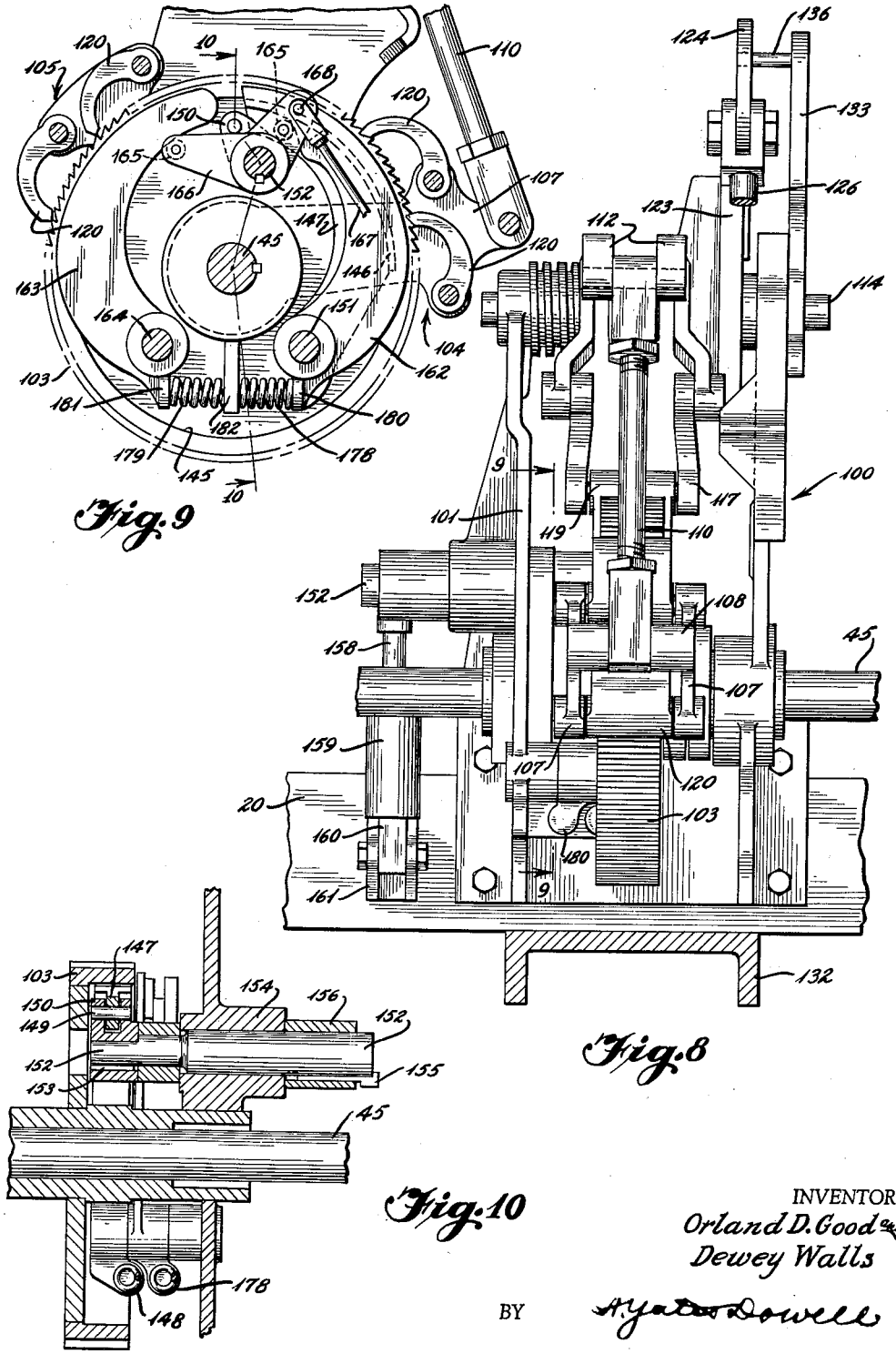

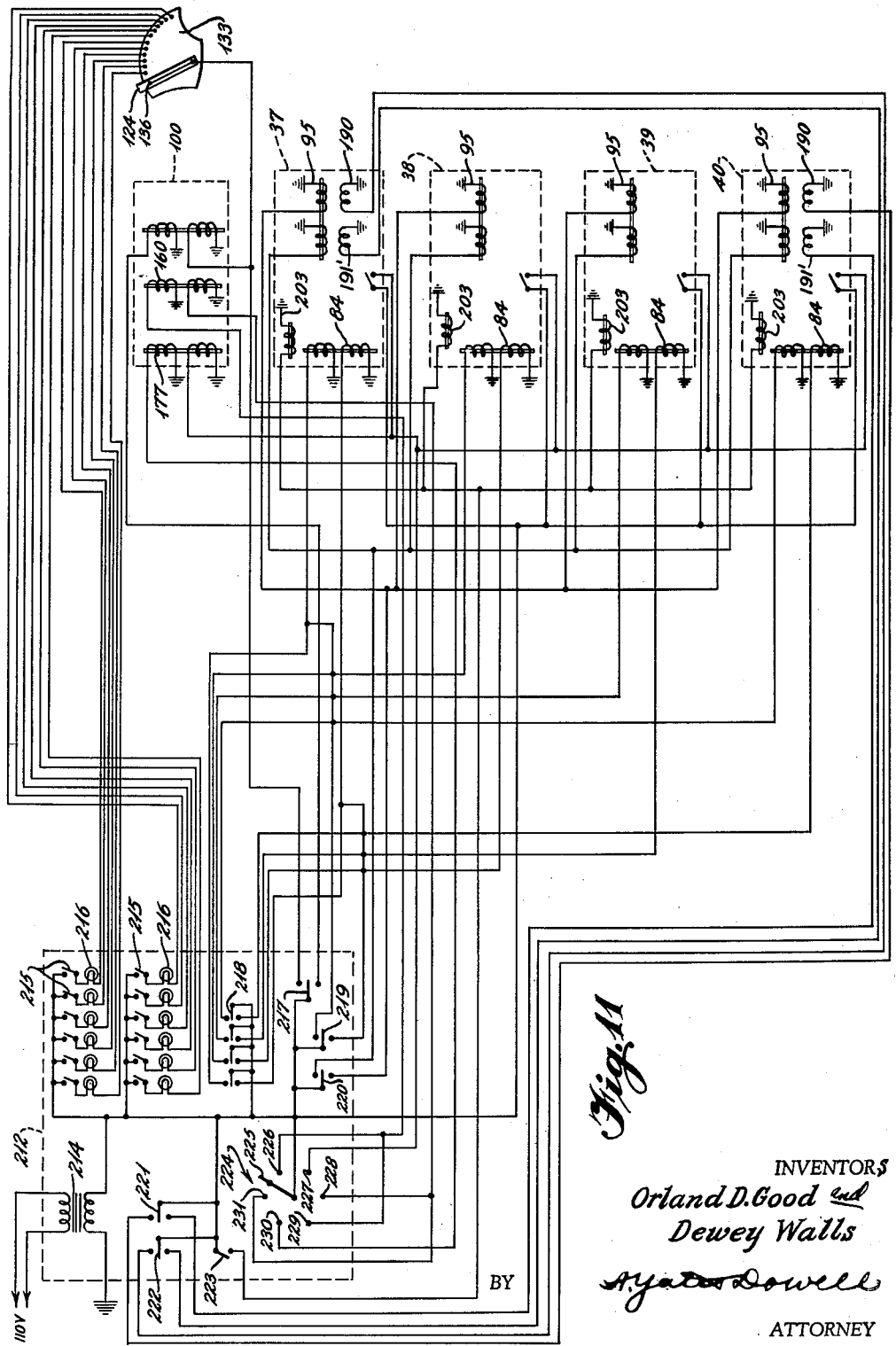

United States Patent Office
3,088,501
Patented May 7, 1963

3,088,501
PANEL CONTROL SAWMILL
Orland D. Good, Waynesboro, Pa., and Dewey A. Walls, Salisbury, N.C., assignors to Frick Company, Waynesboro, Pa., a corporation of Pennsylvania
Filed Dec. 5, 1960, Ser. No. 73,839
5 Claims. (Cl. 143—118)

This invention relates to the manufacture of lumber and to the equipment utilized including that for supporting, gripping, advancing, and sawing logs as well as for ejecting the uncut portion of such log.

The invention relates particularly to sawmills including the reciprocable carriages and the mechanisms thereon for holding, advancing strip by strip and retracting the mechanisms by which the logs are held and advanced and to labor saving devices including automatic control means therefor.

Sawmills have been produced of various types and constructions and with certain of the operations performed by hand while other operations were performed mechanically and with certain of the operations automatically accomplished. Notwithstanding the advances which have been made considerable labor and attention has been and is still required making it desirable to provide further improvement in sawmills.

It is an object of the invention to provide a sawmill which can be operated with minimum labor and attention from a control panel, and including mechanism for controlling the carriage, for supporting positioning and advancing of logs on the carriage, and for the return of the mechanism for handling the next log.

Another object of the invention is to provide cam operated log gripping dogs, double acting set works, a spring receder or retractor and associated parts with the action of the set works subject to a control panel with brake means for controlling the amount of retraction.

A further object of the invention is to provide safety mechanism for automatically releasing the advancing mechanism and permitting the retraction of the same if the advance of the log holding mechanism toward the saw blade is excessive.

A further object of the invention is to provide a combination of elements and actuating means therefor by which a minimum of time, effort and attention is required and with maximum results obtained.

Figure 1:
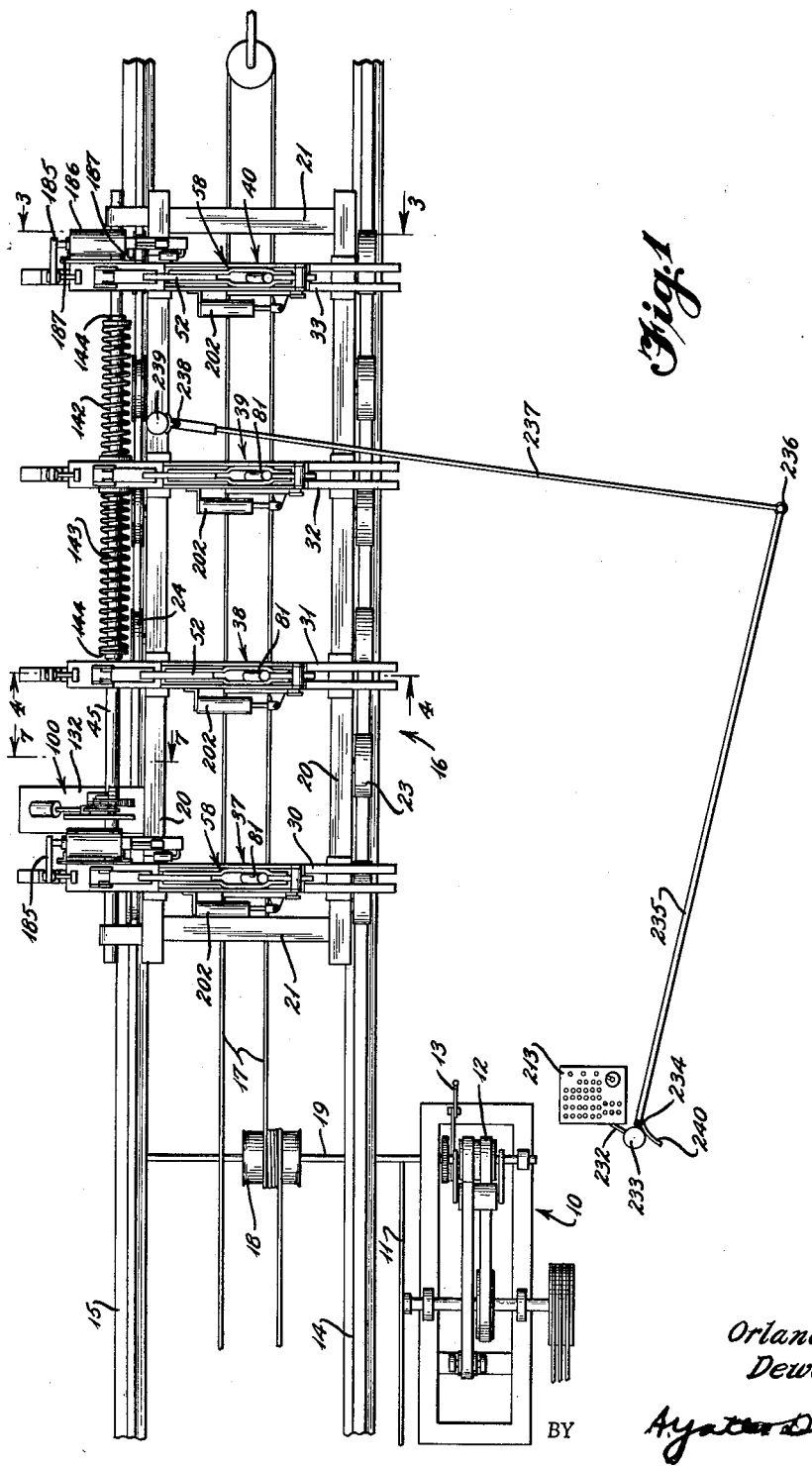
Figure 2:
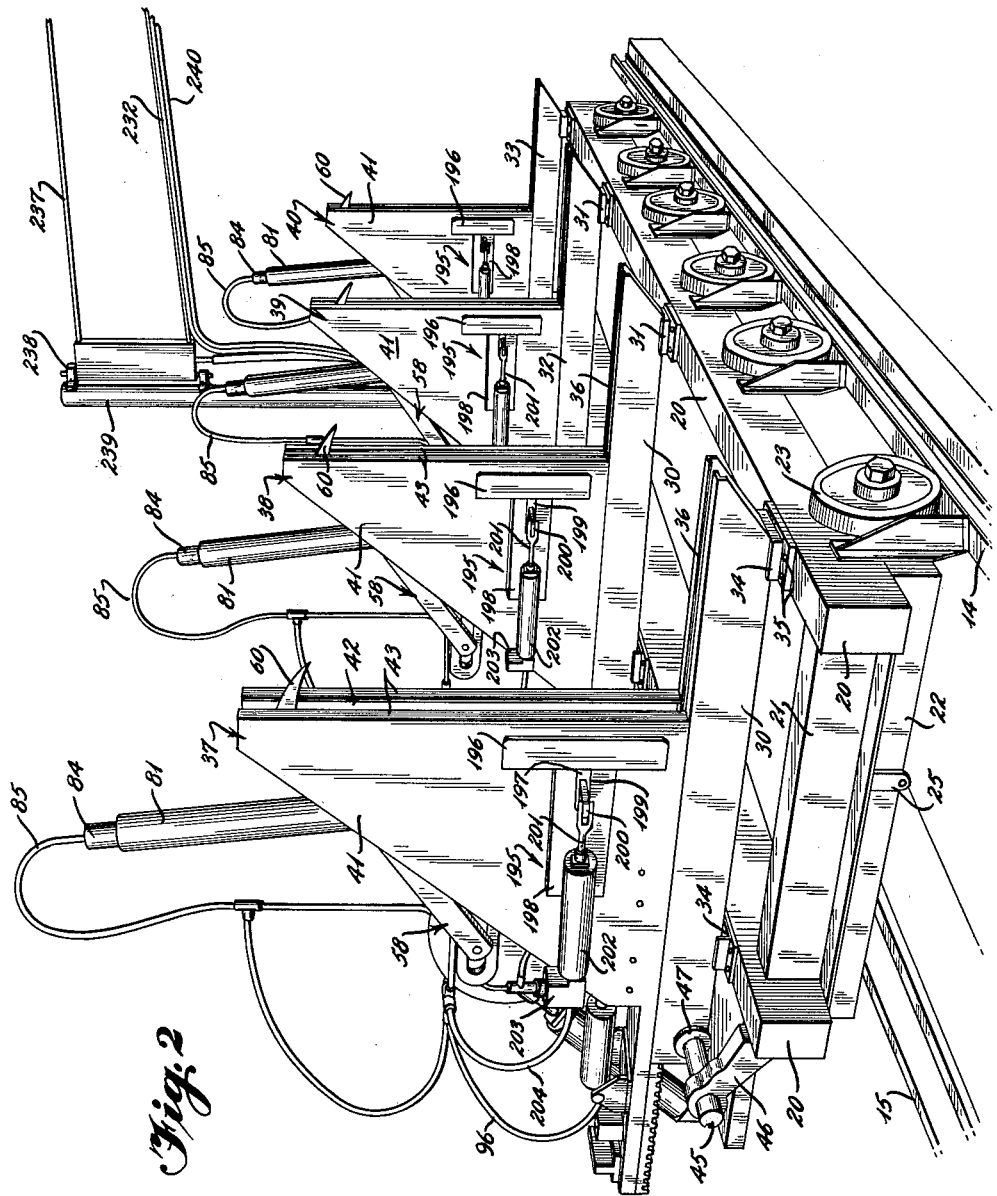
Figure 3:
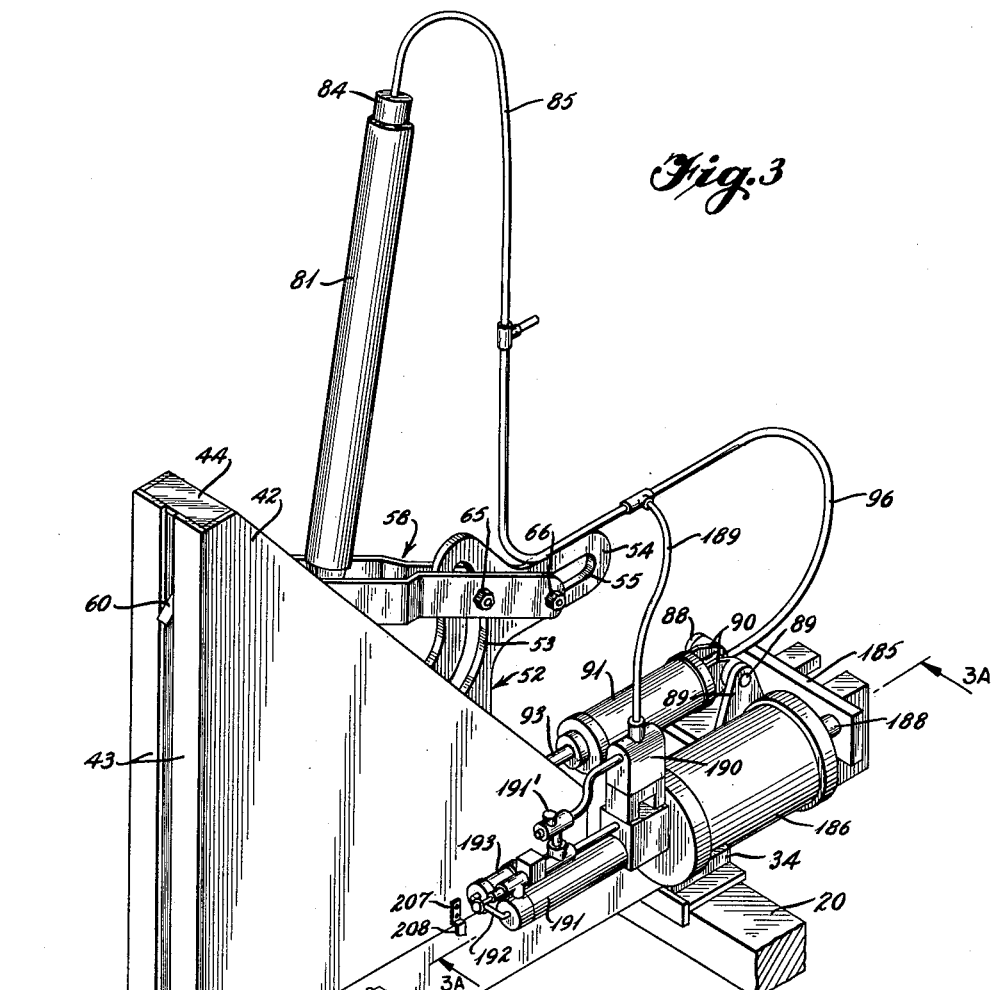
Figure 3A:
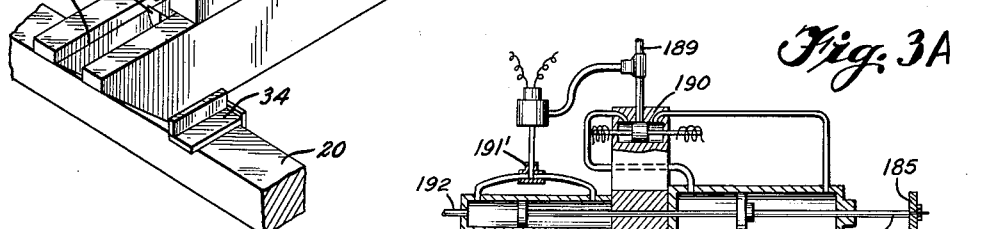
Figure 7:
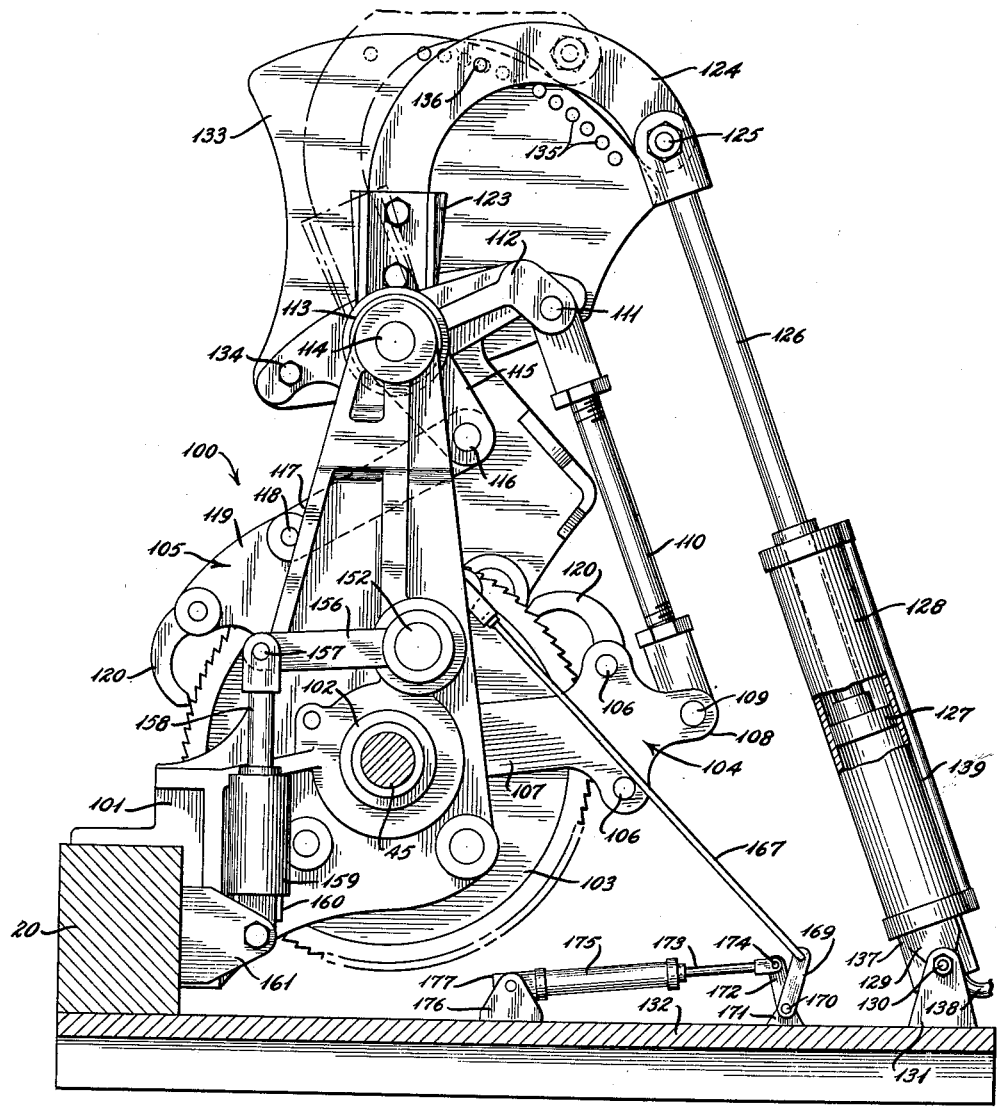

Other objects and advantages of the invention will be apparent from the following description taken in conjunction with the accompanying drawings, in which:

FIG. 1 is a top plan view of a sawmill illustrating one application of the invention;

FIG. 2, a perspective of the carriage of FIG. 1;

FIG. 3, an enlarged fragmentary perspective on the line 3—3 of FIG. 1;

FIG. 3A is a longitudinal section view of certain fluid pressure cylinders and valves operating the taper mechanism;

FIG. 4, an enlarged section on the line 4—4 of FIG. 1;

FIG. 5, an enlarged detail section on the line 5—5 of FIG. 4;

FIG. 6, an enlarged detail section on the line 6—6 of FIG. 4;

FIG. 7, an enlarged section on the line 7—7 of FIG. 1;

FIG. 8, an end elevation of the structure of FIG. 7;

FIG. 9, a section on the line 9—9 of FIG. 8;

FIG. 10, a section on the line 10—10 of FIG. 9; and

FIG. 11, a schematic wiring diagram of the invention.

Briefly stated, the sawmill of the present invention includes the usual log carriage reciprocable on rails by means of a cable about a drum or other suitable operating mechanism. On the carriage are located a series of transversely disposed headblock bases or slides and along the upper surfaces of which headblock L's are supported. Log engaging dogs are adjustably carried by head headblock L's so that when a log is placed on the bases the clamping dogs of the headblock L's engage the log so that it can be shifted transversely of the carriage along the headblock bases or slides for advancing the log into position to be moved by the carriage into engagement with a saw or saws. Among the important features of the present invention are the structure of the log engaging headblock L's, the log engaging and holding dogs carried by the headblock L's, the control mechanism for the headblock L's and the dogs, the automatic set works for advancing the headblock L's, the spring retracter or receder for retracting the headblock L's, the operation of the headblock L's including the independent control of one or more of the headblock L's to accommodate the particular taper of the log, safety mechanism for automatically retracting the headblock L's when they have advanced too far, and an unloading attachment connection with each of the headblock L's.

With continued reference to the drawings, a sawmill 10 is provided having a saw or saws 11, operating mechanism 12 therefor, and a control lever 13. The saw 11 is located in proximity to a pair of rails 14 and 15 on which a reciprocating carriage is supported and with a cable 17 about a drum 18 on a shaft 19 extending from the operating mechanism 12 and controlled by the lever 13.

The carriage 16 comprises a pair of side members 20 connected by cross members 21 and 22 and supported by wheels 23 and 24 which rest upon the rails 14 and 15, respectively. A bracket (FIG. 2) projects downwardly from the central portion of cross member 22 and provides a connection for the cable 17 for moving the reciprocable carriage back and forth over the rails 14 and 15.

A series of headblock slides or mounting members 30, 31, 32 and 33 are secured on top of the frame members 20 and transversely thereto by mounting blocks 34 secured by fasteners 35. The slides project outwardly beyond the frame members 20 and are of generally hollow configuration with an opening or slot 36 located centrally of the upper surface of each slide.

Headblock L's 37, 38, 39 and 40 are mounted on the slides 30–33, respectively, and are adapted to be moved along the slides in a manner which later will be described. The headblock L's are generally of triangular configuration and include a pair of relatively large spaced upright side plates 41 and 42, each having an inturned flange 43 and connected at their upper ends by a brace 44 (FIG. 3). A shaft 45 mounted in brackets 46 (FIG. 2) carried by one of the frame members 20 projects through the slides 30, 31, 32 and 33 and is supported by bearings 47 in each of such slides. A pinion 48 (FIG. 4) is mounted on the shaft 45 by a key 49 along the longitudinal axis of each of the slides and engages a rack 50 mounted on a base plate 51 to which the side plates 41 and 42 are permanently attached. The base plate 51 has a relatively smooth upper surface upon which a tong dog support member 52 (FIGS. 1, 3 and 4) is adapted to slide. The member 52 is provided with a vertically disposed arcuate slot or cam 53 in its upper portion and has a rearwardly extending protrusion 54 with a longitudinal slot 55 therein.

Upper and lower tong dog arms 58 and 59, respectively, are pivotally mounted on the support member 52, the upper dog arm 58 including a bit connected by nuts and bolts 61 or other fastening means to a pair of plates 62 and 63 which are bent outwardly to form an enlargement 64 for a purpose to be described and the free ends of such plates form a yoke which straddles the support member 52. The free ends of the dog arm 58 are connected by nuts and bolts 65 and 66 through the slots 53 and 55, respectively, of the support member 52 and such bolts provide support shafts for rollers 67 and 68 (FIG. 5) located within the slides 53 and 55 to guide the upper dog arm 58. The roller 68 operates in a substantially parallel plane with the base plate 51 and the roller 67 operates in the vertically disposed arcuate slot 53 so that the tip of the bit 60 will remain substantially parallel to the inturned flanges 43 of the headblock L, as illustrated in phantom in FIG. 4.

The lower tong dog arm 59 includes a bit 70 with a heel portion 71 provided with a groove or cut-out 72 in which is received the base plate 51 of the headblock when in retracted position. The body 73 of the lower dog has a rearwardly extending offset portion 74 (FIG. 6) which extends rearwardly along one side of the support member 52 and a cooperating yoke plate 75 which is welded or otherwise attached to the body 73 and extends rearwardly along the opposite side of the support member 52. The free ends of the offset portion 74 and the yoke plate 75 are pivotally mounted on the support member 52 by a bolt and nut 76.

In order to raise and lower the tong dogs 58 and 59, the lower dog 59 has a bracket 77 welded or otherwise fixed to the upper surface of the body 73 and such bracket is attached by a pivot pin or bolt 78 to one end of a piston rod 79 operated by a piston 80 within an hydraulic or pneumatic cylinder 81. The lower end of the cylinder 81 is provided with a pair of brackets 82 which extend downwardly into the enlarged portion 64 of the upper tong dog 58 and are connected thereto by pivot pins 83 (FIG. 5). A conventional double-acting solenoid valve 84 is mounted on the upper end of the cylinder 81 and such solenoid valve under the influence of the saw mill operator is adapted to direct fluid introduced through line 85 into either the upper end or the lower end of the cylinder to control the direction of movement of the tong dogs. As illustrated in FIG. 4, when it is desired to close the dogs, fluid may be introduced into the lower end of the cylinder 81 whereupon one of the dogs, usually the upper dog, aided by gravity, will be operated until it strikes a solid object, such as a log, whereupon the other dog will be operated until it also strikes the solid object and pressure will be applied to the dogs to cause the bits thereof to bite into the solid object to hold the same in fixed position.

On occasion it is desirable to extend the dogs outwardly of the headblock L's to engage the rounded contour of a log. For this purpose, a bracket 88 is mounted on the rear portion of the base plate 51 and is connected by a pivot pin 89 (FIG. 3) to a pair of mounting plates 90 on one end of an hydraulic or pneumatic cylinder 91 having a piston 92 and a piston rod 93 the free end of which is connected by a pin 94 to the rear of the support member 52. A double-acting solenoid valve 95 of conventional character is mounted on the end of the cylinder 91 remote from the piston rod 93 and directs fluid introduced through a line 96 into either the forward or rear end of such cylinder to control the direction of movement of the support member 52.

The headblock L's 37–40 are adapted to be advanced by rotating the shaft 45 in one direction to cause the pinion 48 to move the rack 50 and to be retracted by rotation of shaft 45 in the opposite direction. The shaft is rotated in a direction to advance the headblock L's by a setworks 100 (FIGS. 7 and 8) located on the rear of the carriage intermediate the headblocks L's 37 and 38. Such setworks comprises a supporting frame 101 mounted on one of the frame members 20 and having bearings 102 for the reception of the shaft 45. A ratchet wheel 103 is keyed or otherwise fixed to the shaft 45 and is adapted to be rotated by a pair of pawl assemblies 104 and 105 having pawls 120 which preferably are of a width greater than the width of the ratchet. The pawls 120 of the assembly 104 are mounted by pins 106 to arms 107 rotatably mounted on the shaft 45. The free ends of the arms 107 terminate in bosses 108 rotatably connected by a pin 109 to a link 110. The opposite end of such link is connected by a pin 111 to a pair of rocker arms 112 carried by hubs 113 rotatably mounted on shaft 114 which is fixed within the frame 101. A second arm 115 projects downwardly from each of the hubs 113 and is connected by a pin 116 to a link 117, the opposite end of which is connected by a pin 118 to a pair of arms 119 having pawls 120 which form part of the pawl assembly 105 and is rotatably mounted on the shaft 45.

In order to rotate the ratchet 103 the rocker arm 112 is adapted to be oscillated by a bracket 123 fixed on such rocker arm and having a generally U-shaped connecting member 124. The free end of the U-shaped member 124 is connected by a pin 125 to a piston rod 126 operated by a piston 127 within an hydraulic or pneumatic cylinder 128. Such cylinder is supported by a pair of lugs 129 mounted by pins 130 to brackets 131 carried by a platform 132 extending outwardly from and supported by the frame member 20. The amount of movement of the piston rod 126 and the U-shaped connecting member 124 is controlled by a segmental contact board 133 mounted on the frame 101 by bolts (FIG. 7) or other fastening means 134 and having a plurality of contacts 135 located along the periphery of the segmental contact board.

The U-shaped connecting member 124 has a contact or brush 136 connected electrically to a double acting solenoid valve 137 on the lower end of the cylinder 128 which controls the direction of flow of the fluid introduced through line 138 and directs such fluid to one end or the other of the cylinder 128 through a bypass 139 (FIG. 7). The operator or sawyer energizes one of the contacts 135 in a manner which will be described later and then introduces hydraulic fluid through the line 138 and through the solenoid valve 137. Such fluid is discharged into the cylinder 128 at the upper end thereof to move the connecting member 124 and the brush 136 carried thereon until the brush 136 engages the contact 135 which has been energized whereupon the double acting solenoid 137 will be reversed and will direct the fluid to the lower portion of the cylinder to return the U-shaped connecting member to its original position. During the first part of the stroke when the connecting member is moving outwardly the pawls 120 of the pawl assembly 105 will engage the teeth of the ratchet 103 and rotate such ratchet in a counterclockwise direction as viewed in FIG. 7 to rotate the shaft 45. During the second part of the stroke when the connecting member is moving inwardly the pawls 120 of the assembly 105 become disengaged from the teeth and the pawls 120 of the assembly 104 will engage the teeth of the ratchet 103 and continue to move the ratchet in a counterclockwise direction until the connecting member reaches its initial position. The rotation of the shaft 45 rotates the pinions 48 and moves the racks 50 with the headblock L's mounted thereon in a lateral direction outwardly.

In order to return the headblock L's to a retracted position a pair of torque springs 142 and 143 (FIG. 1) are provided having one end fixed to the shaft 45 by connectors 144 and the opposite ends connected to the guide 32 under a preloaded stress. As the shaft 45 is rotated by the setworks, additional torque is applied to the springs 142 and 143 and upon releasing the ratchet 103 the torque springs 142 and 143 will return the headblock L's to a fully open position. Normally, two or more of the pawls 120 prevent the torque springs from returning the headblock L's to their fully open position. To remove the pawls the ratchet 103 has an internal brake drum 145 with a brake shoe 146 mounted on a brake arm 147 in close proximity to a substantial portion of the brake drum. The brake shoe is maintained away from the brake drum by a spring 148 (FIG. 10) and in order to move the brake shoe 146 into contact with the brake drum 145 a pin 149 mounted on a bifurcated arm 150 is adapted to engage the brake arm 147 and rotate the arm about a pivot 151 until the shoe engages the drum. The arm 150 is mounted on one end of a shaft 152 by a key 153 and such shaft is rotatably received within a hub 154 forming a part of the frame 101. The opposite end of the shaft 152 is fixed by a key 155 to a crank arm 156, the free end of which is connected by a pin 157 (FIG. 7) to a piston rod under the influence of a hydraulic or pneumatic cylinder 159 controlled by a valve 160 mounted by a bracket 161 to the frame member 20 so that when fluid is introduced into the cylinder 159 the crank arm 156 is moved upwardly to pivot the arm 150 against the brake arm 147 to move such shoe into contact with the drum and prevent rotation of such drum.

When the brake has been set to prevent rotation of the ratchet 103 it may be desired to remove the pawls 120 from contact with the teeth of the ratchet. To do this a pair of cams 162 and 163 (FIG. 9) are located adjacent to the ratchet 103 and are pivotally mounted on shafts 151 and 164, respectively, in a position whereby they can be moved outwardly to engage the portions of the pawls which project beyond the limits of the ratchet.

The cams are adapted to be moved about such pivots by rollers 165 contacting the cams 162 and 163 mounted on the ends of a bell crank 166 pivotally carried by the shaft 152. The bell crank 166 is oscillated by a connecting rod 167 connected thereto by a pin 168 and the remote end of such rod is connected to an arm 169 (FIG. 7) fixed on a shaft 170. The shaft 170 is rotatably received within bearings 171 mounted on the platform 132 and has an arm 172 fixed to its opposite end. A piston rod 173 is connected by a pin 174 to the free end of the arm 172 and is under the influence of a hydraulic or pneumatic cylinder 175 mounted by bracket 176 to the platform 132 and having a double acting solenoid 177 for directing fluid into either end of the cylinder 175. The cylinder 175 is controlled by the sawyer to release the pawls 120 from the ratchet 103 so that the torque springs 142 and 143 can return the headblock L's to a retracted position. Cams 162 and 163 are normally held in inoperative position by springs 178 and 179 (FIG. 9) located between projections 180 and 181 on the cams 162 and 163, respectively, and a lug 182 projecting inwardly from the frame 101.

The two end headblock L's or knees 37 and 40 are provided with mechanisms for independently advancing the headblock L's to compensate for the taper of the log being cut. In order to accomplish this the rack 50 of each of such headblock L's has a bracket 185 (FIG. 3) mounted on the top thereof and such bracket extends outwardly beyond the limits of the guides 30 and 33. A combination hydraulic and pneumatic cylinder 186 is mounted by brackets 187 (FIG. 1) to the base plate 51 and has a piston rod 188 connected to the bracket 185. Fluid such as compressed air is introduced into the cylinder 186 through a line 189 and a double acting distributing valve 190 controlled by two built in solenoids. In order to accurately control the taper movement of the L and fixedly stop it at any point in its travel the pneumatic cylinder 186 and a closed circuit hydraulic cylinder 191 are mounted in line, each cylinder carrying its own piston with both pistons fixedly mounted on the rod 188 extending through both cylinders 186 and 191. The solenoid controlled double acting distributing valve 190 admits compressed air to either side of the piston in cylinder 186, causing the headblock L to slide on headblock base 34 and rack 50, thus advancing or retracting the headblock L to provide the taper movement desired. A solenoid controlled needle valve 191' mounted in the closed hydraulic circuit of cylinder 191 controls the flow of fluid from one end to the other end of such cylinder. Actuation of the needle valve 191' in cylinder 191 interrupts the flow of fluid from one end of cylinder 191 to the other and stops movement of the piston rod common to both cylinders 186 and 191 at any point in its travel. Fluid line 192 and balancing cylinder 193 compensate for the displacement of the piston rod in cylinder 191.

Each of the headblock L's is provided with a carriage unloader attachment (FIG. 2) comprising a push bar 196 mounted on a base plate 197 within a housing 198. The housing 198 has a slot 199 at its forward edge through which a lug 200 connected to the base plate 197 projects. A piston rod 201 is connected to the free end of the lug 200 and is projected and retracted by a spring loaded hydraulic or pneumatic cylinder 202 under the influence of a solenoid valve 203 which directs fluid introduced through line 204 into one end of the cylinder 202 to push the remaining piece of wood off of the carriage after the boards have been cut from the log. When the pressure within the cylinder 202 is relieved, the spring will retract the push bar to an inoperative position.

In order to make sure that the bits 60 and 70 are not accidentally extended into the path of the saw blade 11, each headblock L has mounted thereon adjacent to its lower extremity a bracket 207 (FIG. 3) with a depending offset portion 208. The offset portion 208 is adapted to engage a microswitch 209 located in a predetermined position on the headblock L guide and connected electrically to the double acting solenoid valve 177 of the cam cylinder 175 (FIG. 7). When the microswitch 209 is energized by the forward movement of the headblock dog bits 60 and 70, the valve 177 directs fluid into the cylinder 175 and the piston rod 173 is extended to cause the pawls 120 to be removed from the ratchet 103 whereupon the torque springs 142 and 143 will return the headblock L's to a retracted position.

The functions performed by the mechanisms on the carriage are under the constant control of a sawyer from a remote position. The sawyer has at his command a control box 212 (FIG. 11) having a panel 213 (FIGS. 1 and 11) preferably located adjacent to the saw blade 11 and such box contains a transformer 214 for reducing 110 v. input current to 10 v. which is utilized by the various components. The headblocks 37–40 may be advanced by the setworks 100 in any desired increments with increments of 1/8" between board thicknesses of 5/8" to 2" having been found satisfactory. A switch 215 and an indicating light 216 is provided on the panel 213 for each increment and each switch energizes a separate contact 135 on the contact board 133.

A momentary contact type switch 217 is located on the panel to control the supply of electrical current to the setworks. One pole is used to activate the valve 137 so that fluid will move the piston 127 in one direction until the contact 136 on the U-shaped connector 124 engages the contact 135 on the contact board 133 which has been energized whereupon the valve will be reversed and fluid will move the piston in the opposite direction. The other pole of switch 217 is used to jog the setworks a small amount, independent of contacts 135, by reversing the valve 137 and consequently the fluid at any time.

The tong dog arms 58 and 59 on each of the headblock L's may be raised and lowered by cylinder 81 under the influence of solenoid valve 84 controlled by individual switches 218 on the panel or the tong dog arms may be moved in unison by a combination control switch 219. The cylinders 81 which advance and retract the tong dog arms under the influence of solenoid valves 95 are simultaneously controlled by a double pole switch 220 on the panel to move the tong dog arms in either direction horizontally.

A pair of double pole switches 221 and 222 are mounted on the panel 213 and are adapted to energize valves 190 and 191' on the headblock L's 37 and 40 to control the direction of flow of fluid to the cylinder 186 and 191 to move such headblock L's to compensate for the taper of the logs and to lock them in place at any point of their travel.

The carriage unloader attachments are extended when a switch 223 on the panel is closed to energize valves 203 and introduce hydraulic fluid into the cylinders 202.

The sawyer controls the retraction of the headblocks by a circular switch 224 having an arm 225. When the arm 225 is rotated it first energizes a contact 226 to introduce fluid into cylinder 158 to apply the brake shoe 146 to the drum 145 and prevent rotation of the ratchet 103. Next, the arm engages a contact 227 to energize cylinder 175 to cause the cams 162 and 163 to remove the pawls 120 from the ratchet. Next, the arm engages a contact 228 which causes the cylinder 158 to retract the brake shoe whereupon the torque springs 142 and 143 will return the headblock L's to an operative position. Next, the arm engages a contact 229 which again causes the cylinder 158 to apply the brake 246 to the drum 145 and prevent rotation of the ratchet 103. Next, the arm engages a contact 230 which reverses the valve 177 and introduces fluid into the opposite end of cylinder 175 and returns the cams 162 and 163 to an inactive position in which the pawls 120 again engage ratchet 103. Upon continued rotation of the arm a contact 231 is engaged which causes the cylinder 158 to retract the brake shoe from the drum so that the ratchet is free to operate and extend the headblocks.

The switches on the panel 213 are electrically connected to the mechanisms on the carriage by lines carried by a conduit 232 (FIG. 1) which extends upwardly through a post 233. The upper end of the post has a hinge 234 for pivotally supporting one end of a pantograph arm 235 the opposite end of which is connected by a hinge 236 to one end of a second pantograph arm 237. The opposite end of the arm 237 is pivotally supported by a hinge 238 to the upper end of a post 239 welded or otherwise secured to the carriage 16. The conduit 232 extends outwardly from the post 233 and is connected to and supported by the arms 235 and 237 until it is suspended above the carriage whereupon it is lowered to the carriage and the lines connected to their associated mechanisms.

Fluid for operating the carriage mechanisms is supplied through a line 240 from a source not shown and such line is likewise carried to the carriage by the pantograph arms 235 and 237.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. In a movable sawmill carriage having a plurality of headblock L's operated by a shaft, a setworks comprising a ratchet wheel mounted on said shaft, fixed structure mounted on said carriage, a first pawl assembly pivotally mounted on said shaft and engaging one side of said ratchet wheel, a second pawl assembly pivotally mounted on said shaft and engaging the other side of the ratchet wheel, rocker arm means rotatably mounted on said fixed structure, links connecting said pawl assemblies to the respective end of said rocker arm means, a connector pivotally attached at one end to said fixed structure and pivotally attached at its opposite end to the piston rod of a reversible fluid cylinder, an electrical contact located on said connector, a series of electrical contacts located on said fixed structure in a position to be sequentially engaged by said connector contact whereby when one of said series of contacts is energized the fluid cylinder will move said connector and the rocker arm means to cause said first pawl assembly to move said ratchet wheel in one direction until said connector contact engages the energized contact whereupon said fluid cylinder will be reversed and move the connector and ratchet arm means in the opposite direction to cause said second pawl assembly to move said ratchet wheel further in said one direction.

2. In a sawmill carriage having a plurality of headblock L's operated by a shaft, a setworks comprising ratchet wheel means on said shaft, multiple pawl assemblies engaging said ratchet wheel means, rocker arm means pivotally mounted on said carriage, rigid means pivotally connecting said pawl assemblies and said rocker arm means, said rocker arm means having connector means, a contact carried by said connector means, a series of contacts mounted on the fixed portion of said setworks in a position to be sequentially engaged by said connector means contact, and reversible means for moving said connector means and said rocker arm means whereby when one of said series of contacts is energized said reversible means will move said connector means to cause at least one of said pawl assemblies to move said ratchet wheel means in one direction until said connector means contact engages the energized contact whereupon said reversible means will move said connector means in the opposite direction to cause other of said pawl assemblies to move said ratchet wheel means further in the same direction.

3. The structure of claim 2 in which said reversible means includes a fluid cylinder.

4. The structure of claim 2 in which said reversible means is operated from a remote position.

5. The structure of claim 2 including means for disengaging said pawl assemblies to permit said ratchet means to return to its initial position.

References Cited in the file of this patent

UNITED STATES PATENTS

| | | |
|---|---|---|
| 581,531 | Bodin | Apr. 27, 1897 |
| 796,925 | McDermott | Aug. 8, 1905 |
| 857,663 | Osburn | June 25, 1907 |
| 1,611,058 | Newsom | Dec. 14, 1926 |
| 1,712,311 | Schnell | May 7, 1929 |
| 1,832,908 | Langill et al. | Nov. 24, 1931 |
| 1,853,775 | Pelton | Apr. 12, 1932 |
| 2,633,879 | Andrus | Apr. 7, 1953 |
| 2,707,501 | Creik | May 3, 1955 |
| 2,714,906 | Peterson | Aug. 9, 1955 |
| 2,816,585 | Field | Dec. 17, 1957 |
| 2,861,606 | Fish | Nov. 25, 1958 |
| 2,893,448 | Elworthy | July 7, 1959 |

FOREIGN PATENTS

| | | |
|---|---|---|
| 502,048 | Canada | May 4, 1954 |